(12) United States Patent
Wajda

(10) Patent No.: US 6,324,498 B1
(45) Date of Patent: *Nov. 27, 2001

(54) METHOD OF IDENTIFYING PROGRAM COMPATIBILITY FEATURING ON-SCREEN USER INTERFACE GRAPHIC PROGRAM SYMBOLS AND IDENTIFIERS

(75) Inventor: Wieslawa Wajda, Keltern (DE)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/863,662

(22) Filed: May 27, 1997

(30) Foreign Application Priority Data

May 31, 1996 (DE) .............................................. 196 21 828

(51) Int. Cl.⁷ ...................................................... G06F 17/50
(52) U.S. Cl. ............................ 703/25; 703/27; 345/326; 345/334; 345/348
(58) Field of Search ................................ 395/500, 779, 395/793; 707/517, 531; 345/348, 326, 334, 335, 966, 978; 703/25, 27

(56) References Cited

U.S. PATENT DOCUMENTS

| | | | |
|---|---|---|---|
| 5,371,851 | * 12/1994 | Pieper et al. ........................ 395/164 |
| 5,384,911 | * 1/1995 | Bloomfield ......................... 395/157 |
| 5,386,568 | * 1/1995 | Wold et al. ......................... 395/700 |
| 5,491,784 | * 2/1996 | Douglas et al. .................... 395/159 |
| 5,511,002 | * 4/1996 | Milne et al. ..................... 364/514 R |
| 5,553,281 | * 9/1996 | Brown et al. ....................... 395/600 |
| 5,553,864 | * 9/1996 | Sitrick ................................... 463/31 |
| 5,576,946 | * 11/1996 | Bender et al. ...................... 364/146 |
| 5,579,521 | * 11/1996 | Shearer et al. ...................... 395/680 |
| 5,583,983 | * 12/1996 | Schmitter ............................ 395/705 |
| 5,634,124 | * 5/1997 | Khoyi et al. ........................ 395/614 |
| 5,689,718 | * 11/1997 | Sakurai et al. ...................... 395/779 |
| 5,710,901 | * 1/1998 | Stodejhill et al. .................. 395/339 |
| 5,737,737 | * 4/1998 | Hikida et al. ....................... 707/104 |
| 5,742,836 | * 4/1998 | Turpin et al. ....................... 395/768 |
| 5,745,748 | * 4/1998 | Ahmad et al. ...................... 395/610 |
| 5,745,767 | * 4/1998 | Rosen et al. ........................ 395/704 |
| 5,778,380 | * 7/1998 | Siefert ................................. 707/103 |
| 5,794,206 | * 8/1998 | Wilkinson et al. ..................... 705/1 |
| 5,918,233 | * 6/1999 | La Chance et al. ................ 707/104 |
| 6,003,034 | * 12/1999 | Tuli ..................................... 707/101 |
| 6,044,365 | * 3/2000 | Cannon et al. ......................... 707/2 |
| 6,131,097 | * 10/2000 | Peurach et al. ..................... 707/102 |

FOREIGN PATENT DOCUMENTS

| | | |
|---|---|---|
| 0480859 | 4/1992 | (EP) . |
| 0640915 | 3/1995 | (EP) . |
| 0689134 | 12/1995 | (EP) . |
| 2241629 | 9/1991 | (GB) . |

OTHER PUBLICATIONS

"Out of Flatland: Toward 3–D Visual Programming" Exploring Technology—Today and Tommorrow, Dallas, Oct. 25–29, 1987, Inst of Elect.and Elec. Engineers, p. 294.

"Tinkertoy Graphical Programming Environment" IEEE Transactions on Software Eng. Bd. 14, Nr. 1, Aug. 1, 1988. pp. 1110–1115.

"Drag–and–drop–Mechanisms in Their Programs", Microsoft System Journal Sep./Oct. 1992 by Schneider, pp. 63–64.

* cited by examiner

Primary Examiner—Kevin J. Teska
Assistant Examiner—Thai Phan
(74) Attorney, Agent, or Firm—Ware, Fressola, Van Der Sluys & Adolphson LLP

(57) ABSTRACT

By means of a user interface the application programs which are accessible through said user interface are visually represented on the display of a computer as icons (IC; P1, P2, P3, P4). It is proposed to assign an identification (DF1, DF2; DF3, . . . , DF8) to such an icon (IC; P1, P2, P3, P4) indicating which data format can be processed by the application program represented by the icon. In a simple and concise manner this identification allows compatibility with another application program which is accessible through the user interface to be determined.

11 Claims, 2 Drawing Sheets

METHOD OF IDENTIFYING PROGRAM COMPATIBILITY FEATURING ON-SCREEN USER INTERFACE GRAPHIC PROGRAM SYMBOLS AND IDENTIFIERS

TECHNICAL FIELD

The present invention concerns a method of identifying a compatibility of programs which are accessible through a user interface.

BACKGROUND OF THE INVENTION

The user-friendly operation of computers utilizes a graphic user interface, such as e.g. Windows from the Microsoft Company. Different application programs are accessible through such a user interface. A program manager provides graphic symbols in the form of icons to indicate to a computer user which application programs are accessible. Such an icon represents one application program in each case.

The different accessible application programs can potentially process different data formats so that data streams of two or more application programs cannot simply be linked to each other. Data with a first data format, which were output by a first application program, must therefore first be reformatted for use in a second application program so that they can be processed by the second application program.

If the user wishes to link two or more application programs with each other, he or she must first check whether the data streams are compatible. Compatibility in this case means that the data in the first data format, which were output by the first application program, can be processed by the second application program. In this instance the data streams of the first and the second application program are compatible. The application programs exchange compatibility codes by means of an internal protocol.

SUMMARY OF THE INVENTION

It is the task of the present invention to provide the user with a low-cost and concise recognition of program compatibility.

This task is fulfilled by a method of identifying program compatibility for programs that are accessible through a user interface, on a display device of a computer, the method comprising the steps of displaying the accessible programs as respective graphic symbols; and assigning to the graphic symbol of one of the accessible programs a first identifier which indicates which data format can be processed by the at least one accessible program.

Because of the invention it is fortunately possible to check whether an exchange of data between two or more application programs is possible without the need to exchange the data of the respective application programs.

BRIEF DESCRIPTION OF THE DRAWINGS

To clarify the invention and its advantages, the following describes configuration examples by means of FIGS. 1 to 3, wherein.

BEST MODE FOR CARRYING OUT THE INVENTION

Figure 1:
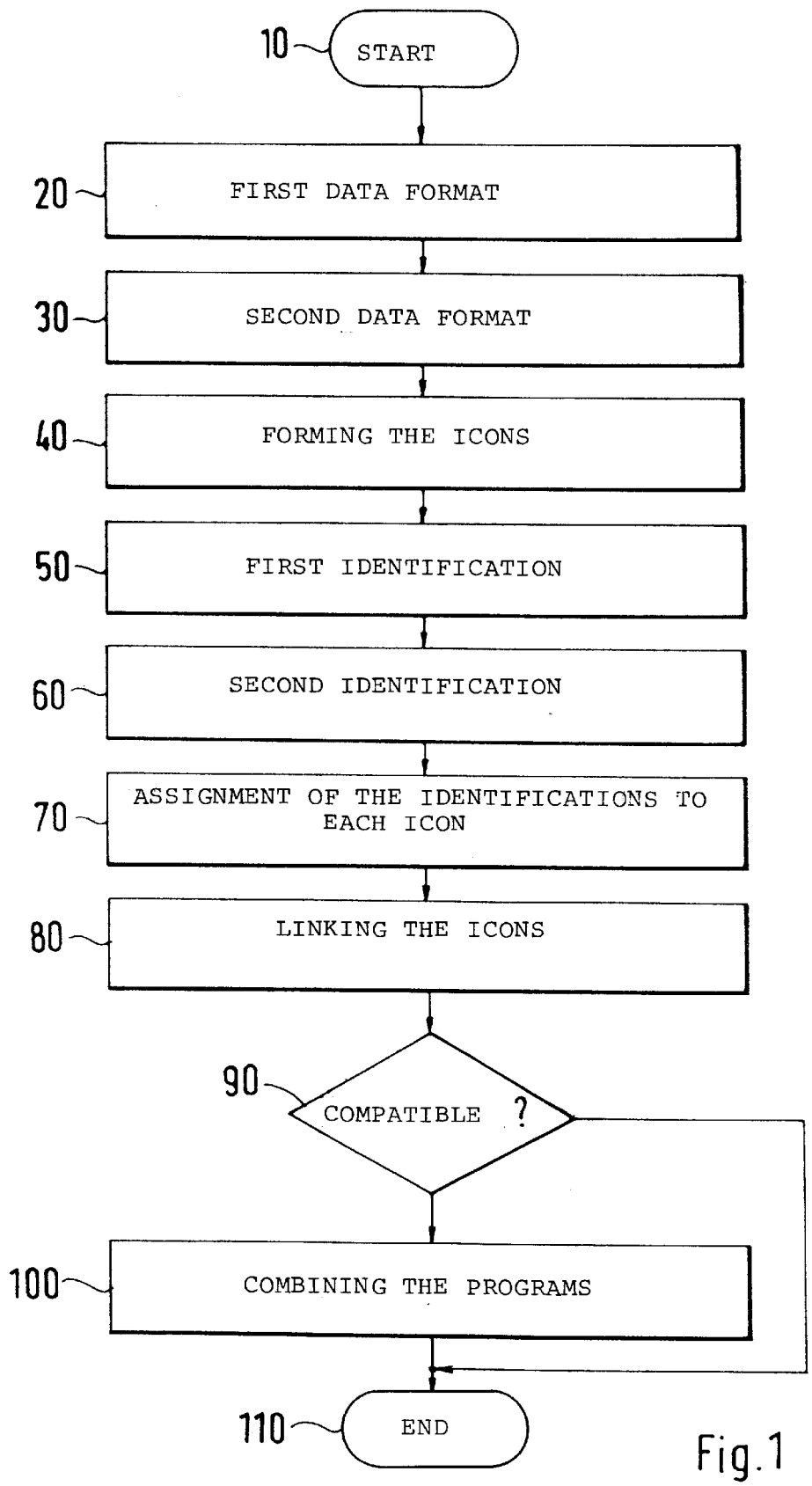
FIG. 1 is a flow diagram of a configuration example of the method of the invention.

FIG. 1 illustrates a flow diagram of a configuration example of the method of the invention. The method of the invention is carried out in a computer system which provides the user with a graphical user interface. The application programs that are accessible through this user interface are visually presented as a graphic symbol in the form of an icon by a program manager of the user interface.

The method begins in a step 10 of the method of the invention in accordance with the configuration example in FIG. 1. In a step 20 it is determined which data format can process a first application program that is accessible through the user interface. It is also possible that the first application program is able to process several data formats. In the following the data formats which can be processed by the first application program are identified as a first data format. Subsequently in a step 30 the data format of the data that are output by the first application program is determined. This determined data format is identified as a second data format in the following. In this case the application program is configured so that it signals the first and the second data format to the outside. This enables a further program to process the first and the second data format.

In a step 40 the first application program is provided with an icon in the program manager of the user interface, i.e. a graphic symbol for the first application program is elaborated in the program manager. The same takes place for the other application programs that are accessible through the user interface. In a step 50 the information about the processable data formats of the application program, which was determined in step 20, is converted into a first identification. In a step 60 the information about the data formats that can be output by the first application program, which was determined in step 30, is converted into a second identification. The first and the second identification can be a graphic identification, an acoustic identification or other type of identification. Examples for use as a first and second identification are a bar code, a color code or a contour code. It is possible to combine the different types of identification.

In a step 70 the first and the second identifications are assigned to the first application program. The first identification for the data format which can be processed by the first application program is advantageously placed at the upper edge of the icon, and the second identification for the second data format which is output by the first application program is placed at the lower edge of the icon. The other program used to further process the information gained in steps 20 and 30 via the first and the second data format for conversion into the first or the second identification is usefully provided by the author of the first application program. The author of the first application program knows best which data formats can be processed and output by his or her application program. In that case uniform rules must be established in all available application programs for the conversion of the first and second data format into the first or the second identification, in order to provide a reliable compatibility test. However the conversion into the first and second identification can also take place independently of the application program. For example, the application program could signal exclusively which first and second data format is processed or output, and is then converted into the first or the second identification by a program which is independent of the application program.

Figure 2:
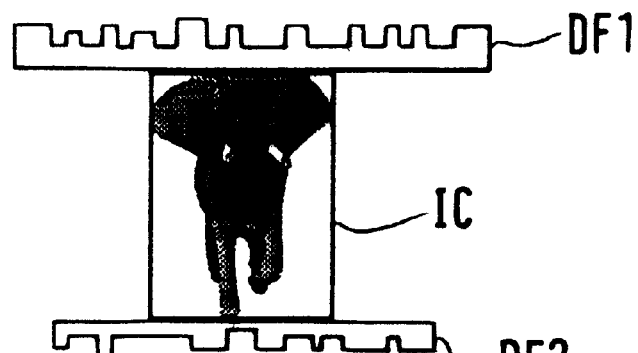
FIG. 2 is an example of an icon with identifications produced on the basis of the invention.

FIG. 2 illustrates such an example of an icon IC with a first identification DF1 and a second identification DF2. In the present configuration example identifications DF1 and DF2 are graphic identifications in the form of a contour code. The first identification DF1 is placed at the upper edge of the icon and represents the first data format which can be processed by the first application program. The second identification DF2 is placed at the lower edge of the icon IC and represents the second data format which is output by the first application program.

In a step 80 of the flow diagram in FIG. 1, the icon of the first application program is linked in the program manager of the user interface to an icon of a second application program which is available through this user interface, for example by means of a mouse. Such a linkage can be carried out for example by means of the so-called drag-and-drop method, as described in the essay "Drag-and-Drop-Mechanisms in Their Programs", Microsoft System Journal, September/October 1992, pages 63 to 64. A step 90 subsequently tests whether the first and the second application programs are compatible. This can be ascertained for example in that the second identification of the first application program and the first identification of the second application program can be assembled in the manner of a jigsaw puzzle. The second data format of the data which are output by the first application program can then be processed by the second application program.

Figure 3:
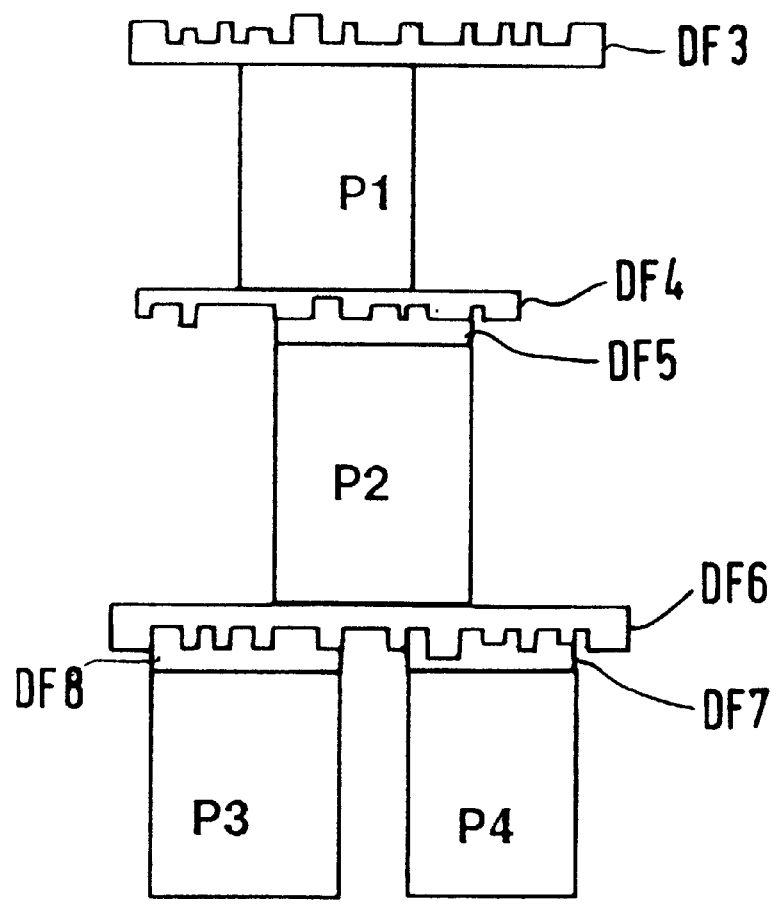
FIG. 3 is an example of linking several icons to determine program compatibility.

FIG. 3 illustrates the example of such a linkage of a first icon P1 to a second icon P2, a third icon P3 and a fourth icon P4. The first icon P1 has an identification DF3 assigned to its upper edge, indicating which data format can be processed by the application program represented by the first icon P1. An identification DF4 is provided at the lower edge of the first icon P1, for a data format of data being output by the application program. An identification DF5 of an icon P2 is inserted into the identification DF4 of icon P1. The identification DF5 represents a data format of data which can be processed by the application program represented by the icon P2. Since the contours of identifications DF4 and DF5 fit into each other, the application programs represented by the icons P1 and P2 are compatible. An identification DF6 is provided at the lower edge of icon P2. This identification DF6 represents a data format of data which are output by the application program represented by P2. An identification DF7 is inserted into this identification DF6, which is assigned to an icon P4 and represents a data format that can be processed by the application program represented by the icon P4. Furthermore an identification DF8 is inserted into this identification DF6, which is assigned to an icon P3 and represents a data format that can be processed by the application program represented by the icon P3. Both the application program represented by the icon P3 and the application program represented by the icon P4 are therefore able to process the data format output by the application program represented by the icon P2.

If it is determined in step 90 of the flow diagram in FIG. 1 that the first and the second application programs are compatible, the two application programs can be combined with each other in a step 100. The data which are output by the first application program are then directly inserted into the second application program and processed therein. The method of the invention is ended in a step 110. If it is determined in step 90 that the first and the second application programs are not compatible, the method of the invention skips over the step 100 and ends.

What is claimed is:

1. A method of indicating compatibility of programs that are accessible through a user interface of a computer, said method comprising the steps of;

displaying a first symbol (IC, P1, . . . , P4) representative of a first accessible program;

attaching a first coding or acoustic data format identifier (DF1, DF2, . . . , DF8) to the first symbol (IC, P1, . . . , P4) that indicates a data format that is input to the first accessible program;

displaying a second symbol (IC, P1, . . . , P4) representative of a second accessible program;

attaching a second coding or acoustic data format identifier (DF1, DF2, . . . , DF8) to the second symbol (IC, P1, . . . , P4) that indicates a corresponding data format that is output from the second accessible program;

linking the first symbol (IC, P1, . . . , P4) of the first accessible program to the second symbol (IC, P1, . . . , P4) of the second accessible program; and comparing the first coding or acoustic data format identifier (DF1, DF2, . . . , DF8) to the second coding or acoustic data format identifier (DF1, DF2, . . . , DF8) to determine the compatibility of the first accessible program with the second accessible program without equiring exchange.

2. A method as claimed in claim 1, wherein the method includes the step of:

indicating with a coding or acoustic data format identifier (DF1, DF3, DF5, DF7, DF8) for either the first coding or acoustic data format identifier (DF1, DF2, . . . , DF8) or the second coding or acoustic data format identifier (DF1, DF2, . . . , DF8) the data format of data that is input to a respective accessible program.

3. A method as claimed in claim 2, wherein the method includes the step of:

using a contour code for either the first coding or acoustic data format identifier (DF1, DF2, . . . , DF8), the second coding or acoustic data format identifier (DF1, DF2, . . . , DF8), or both.

4. A method as claimed in claim 1, wherein the method includes the step of:

indicating with a corresponding coding or acoustic data format identifier (DF1, DF3, DF5, DF7, DF8) for either the first coding or acoustic data format identifier (DF1, DF2, . . . , DF8) or the second coding or acoustic data format identifier (DF1, DF2, . . . , DF8) the data format of data that is output from a corresponding accessible program.

5. A method as claimed in claim 4, wherein the method includes the step of:

using a contour code for either the first coding or acoustic data format identifier (DF1, DF2, . . . , DF8), the second coding or acoustic data format identifier (DF1, DF2, . . . , DF8), or both.

6. A method as claimed in claim 1, wherein the method includes the steps of:

indicating with a coding or acoustic data format identifier (DF1, DF3, DF5, DF7, DF8) for either the first coding or acoustic data format identifier (DF1, DF2, . . . , DF8) or the second coding or acoustic data format identifier (DF1, DF2, . . . , DF8) the data format of data that is input to a respective accessible program; and indicating with a corresponding coding or acoustic data format identifier (DF1, DF3, DF5, DF7, DF8) for either the first coding or acoustic data format identifier (DF1, DF2, . . . , DF8) or the second coding or acoustic data format identifier (DF1, DF2, . . . , DF8) the data format of data that is output from a corresponding accessible program.

7. A method as claimed in claim 6, wherein the method includes the step of:

using a contour code for either the first coding or acoustic data format identifier (DF1, DF2, . . . , DF8), the second coding or acoustic data format identifier (DF1, DF2, . . . , DF8), or both.

8. A method as claimed in claim 1, wherein the method includes the step of:

using a contour code for either the first coding or acoustic data format identifier (DF1, DF2, . . . , DF8), the second coding or acoustic data format identifier (DF1, DF2, . . . , DF8), or both.

9. A method as claimed in claim 1, wherein the method includes the step of: using a bar code, a color code or a contour code for the first coding or acoustic data format identifier (DF1, DF2, . . . , DF8).

10. A method as claimed in claim 1, wherein the method includes the step of; using a bar code, a color code or a contour code for the second coding or acoustic data format identifier (DF1, DF2, . . . , DF8).

11. A method as claimed in claim 1, wherein the method includes the steps of: using a bar code, a color code or a contour code for the first coding or acoustic data format identifier (DF1, DF2, . . . , DF8); and using a bar code, a color code or a contour code for the second coding or acoustic data format identifier (DF1, DF2, . . . , DF8).

\* \* \* \* \*

UNITED STATES PATENT AND TRADEMARK OFFICE
CERTIFICATE OF CORRECTION

Page 1 of 1

PATENT NO. : 6,324,498 B1
DATED : November 27, 2001
INVENTOR(S) : Wajda

It is certified that error appears in the above-identified patent and that said Letters Patent is hereby corrected as shown below:

Column 4,
Line 17, delete "without equiring exchange." and insert -- without requiring data exchange. --.

Column 6,
Line 2, delete ";" and insert -- : --.

Signed and Sealed this

Twenty-first Day of May, 2002

Attest:

Attesting Officer

JAMES E. ROGAN
Director of the United States Patent and Trademark Office